United States Patent [19]

Hayakawa et al.

[11] Patent Number: 4,882,717

[45] Date of Patent: Nov. 21, 1989

[54] CHARGING CIRCUIT FOR AN ANALOG ELECTRONIC TIMEPIECE

[75] Inventors: Motomu Hayakawa; Masahito Yoshino, both of Suwa, Japan

[73] Assignee: Seiko Epson Corporation, Tokyo, Japan

[21] Appl. No.: 246,718

[22] Filed: Sep. 20, 1988

[30] Foreign Application Priority Data

Sep. 21, 1987 [JP] Japan .............................. 62-236463
Sep. 21, 1987 [JP] Japan .............................. 62-236464
Sep. 21, 1987 [JP] Japan .............................. 62-236465

[51] Int. Cl.$^4$ .......................... G04B 1/00; H01M 10/46
[52] U.S. Cl. ..................................... 368/64; 368/160; 368/204; 320/21
[58] Field of Search ............................. 368/155–157, 368/160, 64, 66, 204; 320/2, 21, 41, 42, 61

[56] References Cited

U.S. PATENT DOCUMENTS 3,922,588 11/1975 Kunzel .................................. 368/64
4,644,246 2/1987 Knapen ................................ 368/204

FOREIGN PATENT DOCUMENTS 2103293 10/1972 Fed. Rep. of Germany ........ 368/64
2348107 9/1973 Fed. Rep. of Germany ........ 368/64
52-8867 1/1977 Japan ................................. 368/204
53-22468 3/1978 Japan ................................. 368/64

Primary Examiner—Vit W. Muska
Attorney, Agent, or Firm—Blum Kaplan

[57] ABSTRACT

A chargeable analog electronic timepiece chargeable by an external A.C. voltage source includes a step motor which includes a driving coil. A motor driving circuit coupled to both terminals of the coil receives the A.C. voltage and selectively applies a charge to the coil for either driving the motor or charging a chargeable battery. A charge control circuit controls a period in which the switching circuit charges the chargeable battery and drives the motor. A PN junction placed in parallel to the switching circuit rectifies the A.C. voltage during charging of the secondary battery so that a single motor coil may drive the watch hands as well as charge the battery and a diode of the switching circuit may be utilized as the rectifier.

13 Claims, 7 Drawing Sheets

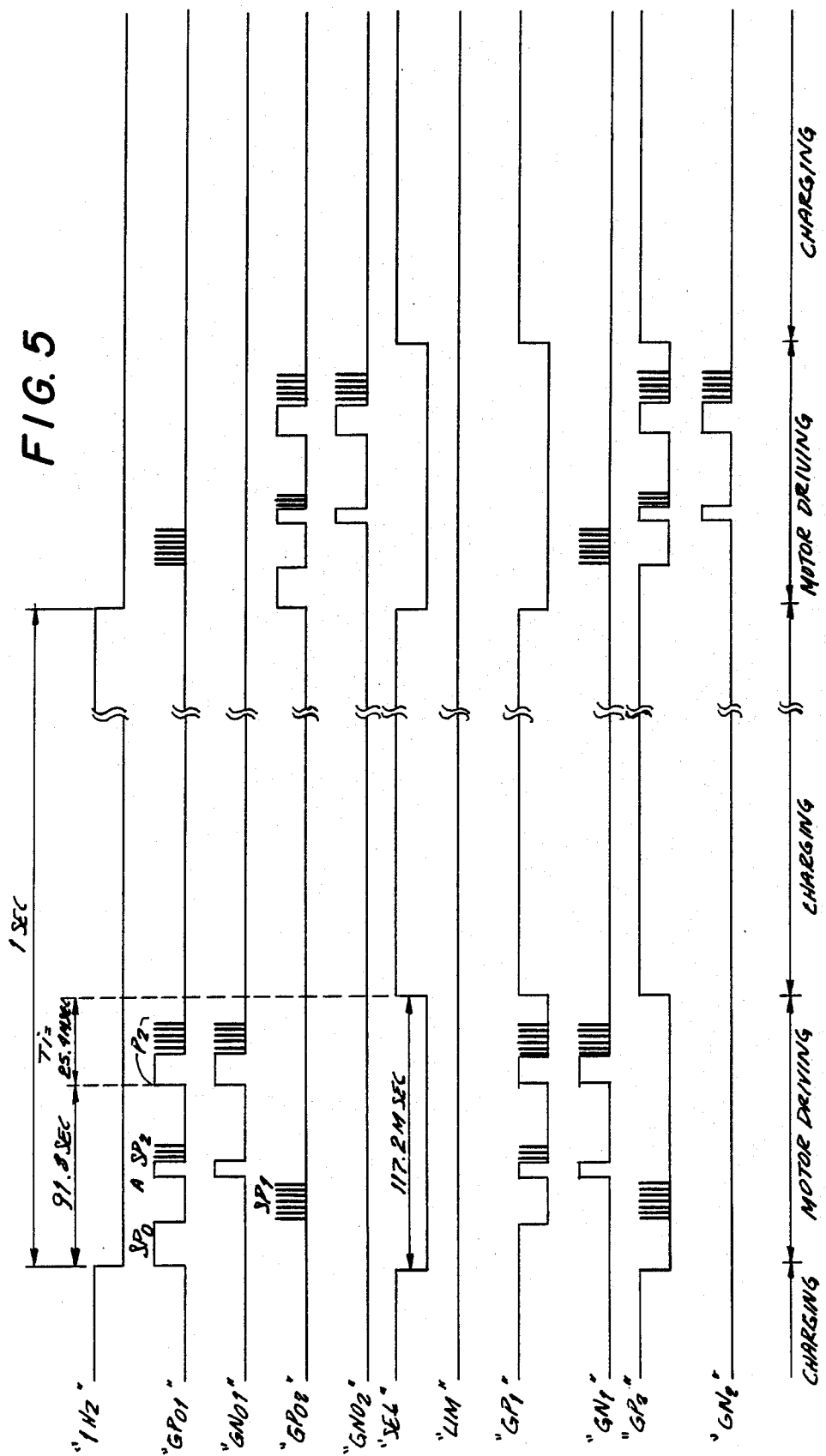

NORMAL ROTATION (180°)

TWICE ROTATION (360°)

REVERSED ROTATION (0°)

CHARGING CIRCUIT FOR AN ANALOG ELECTRONIC TIMEPIECE

BACKGROUND OF THE INVENTION

This invention relates to a chargeable analog electronic timepiece, and in particular, to a charging circuit for a chargeable analog electronic timepiece.

Electronic timepieces having charging circuits are well known in the art and are generally of one of two types. The first type of chargeable electronic timepiece includes a solar battery mounted as part of the dial plate and arranged so that electric power produced by illumination of the solar battery charges the secondary battery.

The second type of chargeable electronic timepiece includes a charging terminal at the external portion of the timepiece arranged so that an electronic power source applied to the timepiece charges the secondary battery when the timepiece is in contact with the external power source. Such a timepiece is well known in the art as exemplified by Japanese Patent Laid-Open Application Nos. 154665/87 and 11846/74 as well Japanese Utility Model Publication No. 4240/81.

Another timepiece of the second type known in the art from Japanese Patent Laid-Open Application No. 29783/86 is an electronic timepiece which includes an electro-magnetic coupling coil disposed within the timepiece and arranged so that the secondary battery is charged when a magnetic field is applied to the electromagnetic coupling coil from the exterior of the timepiece. Similarly, Japanese Patent Application No. 15035/85 provides an electronic timepiece having a motor coil for driving the timepiece and the coil is separated from the timepiece driving circuit during charging when the magnetic field is applied to the motor coil.

These prior art electronic timepieces have been less than satisfactory. Wrist watches are generally small in size limiting the design of the external appearance, particularly when it is necessary to incorporate a solar battery or charging terminal on the face of the watch. Therefore, it becomes difficult to incorporate a solar battery or charging terminal within an analog electronic wrist watch without damaging the ornamental appearance. Additionally, an electro-magnetic coupling system such as that described in Japanese Patent Laid-Open Application No. 29783/86 requires electronic magnetic coupling coils, rectifying diodes and the like as well as the motor coils for driving the wrist watch resulting in an increased physical size as well as an increase in cost. Furthermore, in the wrist watches utilizing the motor coil to both drive and charge the timepiece, a switch is required to alternately connect the coil for driving the timepiece and for charging the timepiece depending upon the movement of the hand or the charging operation. A rectifying diode is also required within the charging circuit. As a result, design flexibility in a chargeable wrist watch is limited and special regard must be paid to the wrist watch due to the mechanical reliability of the switching mechanism. Additionally, use of the watch is inconvenient because movement of the hands stops during charging requiring resetting of the watch after each charging.

Accordingly, it is desirable to provide a chargeable analog electronic timepiece which overcomes the shortcomings of the prior art devices described above.

SUMMARY OF THE INVENTION

A chargeable analog electronic timepiece includes a step motor and a motor driving circuit coupled to at least one coil of the step motor. A chargeable battery coupled to the motor driving circuit drives the step motor. The secondary battery is charged by an exterior A.C. magnetic field through the coil. At least one PN junction is formed in parallel to the motor driving circuit to rectify the applied A.C. magnetic field during charging of the battery.

The motor driving circuit includes a FET acting as a switch. The coil for charging the secondary battery also serves as the coil for driving the step motor.

The analog timepiece may also include three other switches so that a first pair of switches is connected to both terminals of the step motor coil and the positive end of the secondary battery. A second pair of switches connects both terminals of the coil of the step motor to the negative end of the secondary battery. At least three of the respective switches are in the OFF state except for 10 msec during charging of the secondary battery.

The timepiece may also include a voltage detecting circuit for detecting the voltage of the secondary battery. A charge control circuit controls the charging of the secondary battery. The charge control circuit is coupled to the voltage detector circuit so that the voltage of the secondary battery does not exceed a predetermined value during charging. Both terminals of the step motor coil become short circuited so that overcharging of the secondary battery is prevented.

Accordingly, it is an object of the present invention to provide an improved chargeable analog electronic timepiece.

Another object of the invention is to provide a small sized and low cost chargeable analog electronic timepiece.

A further object of the present invention is to provide a chargeable analog electronic timepiece wherein a small logic circuit is incorporated into the integrated circuit chip (IC) removing the necessity for extrinsic electronic circuitry or charging mechanisms.

Yet another object of the instant invention is to provide a chargeable analog electronic timepiece which allows charging during the movement of the hands.

Still another object of the invention is to provide a chargeable electronic timepiece which does not require alteration of the appearance of the electronic timepiece.

Still other objects and advantages of the invention will in part be obvious and will be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a better understanding of the invention, reference is had to the following description taken in connection with the accompanying drawings, in which:

FIG. 2b is an equivalent circuit of the diode of FIG. 2a;

FIG. 5 is timing chart for charging and driving the analog timepiece;

FIG. 10b is a timing chart for the signals of the detection circuit of FIG. 10a.

DETAILED DESCRIPTION OF THE PREFERRED EMBODIMENTS

Figure 1:
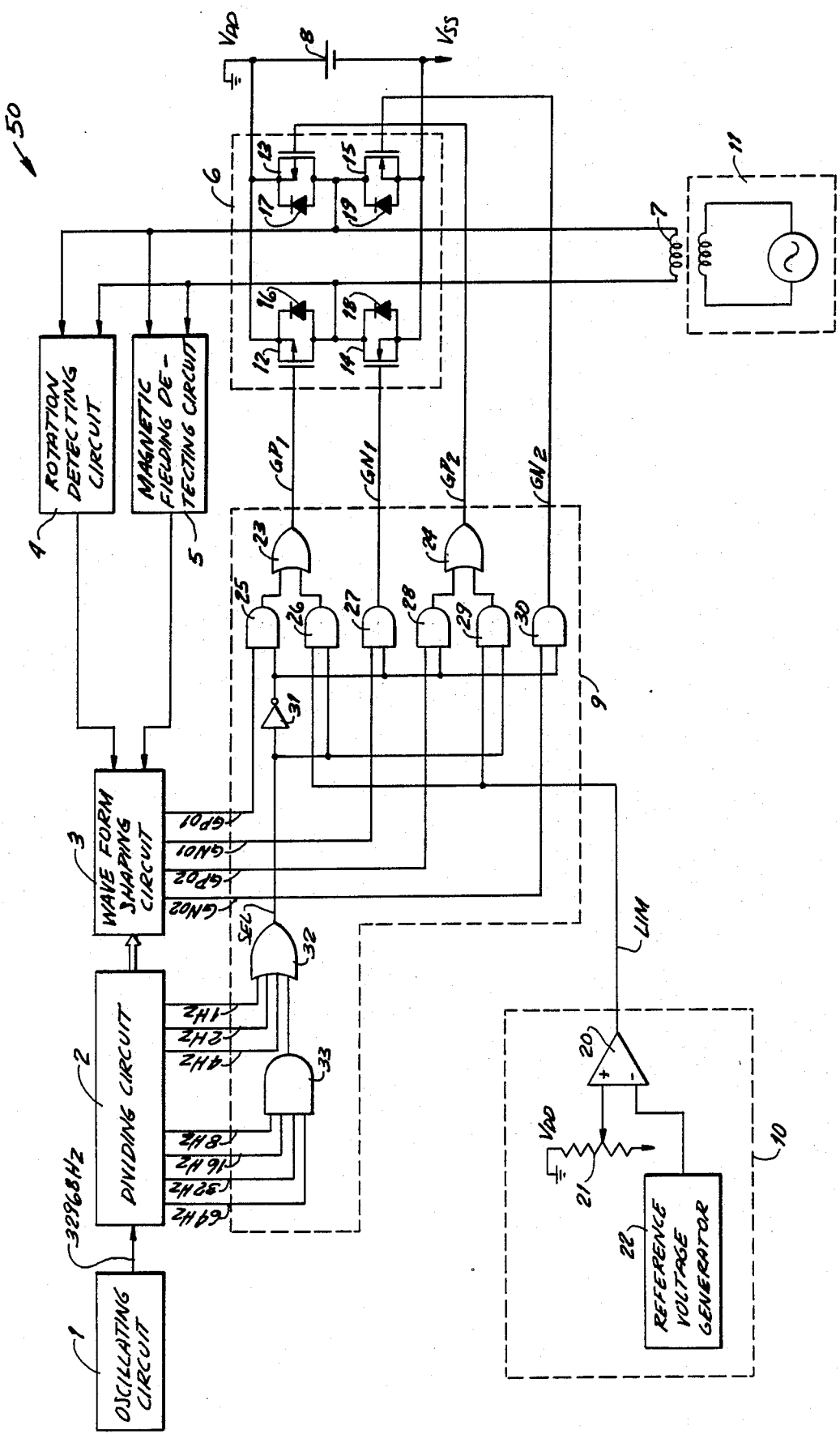
FIG. 1 is a block diagram of one embodiment of a chargeable analog timepiece constructed in accordance with the invention.

Reference is first made to FIG. 1, wherein a block diagram of a chargeable analog electronic timepiece generally indicated as 50, constructed in accordance with the invention is depicted. Timepiece 50 includes an oscillating circuit for providing reference signals, a dividing circuit 2 for dividing the reference signals and a waveform shaping circuit 3. A motor (not shown) is provided for driving the hands (not shown) of timepiece 50. A rotation detecting circuit 4 detects the rotation of the motor. A magnetic field detecting circuit 5 detects the presence of a magnetic field from an external charging source 11. A secondary battery 8 is charged by external charging source 11 while a voltage detector 10 detects the amount of voltage applied to battery 8 and a charging control circuit generally indicated as 9 controls the amount of charge applied to secondary battery 8. A motor driving circuit, generally indicated as 6, drives the motor and charges secondary battery 8.

Oscillating circuit 1 includes a small size quartz oscillator which provides the vibration causing oscillating of circuit 1 to generate a reference signal of 32,768 Hz. The reference signals are sequentially divided by a dividing circuit 2 to generate signals having the frequencies required for driving the remainder of the circuits. Motor driving waveform shaping circuit 3 receives an output from the dividing circuit and generates signals having several timing pulse waveforms that are required for driving the motor.

Rotation detecting circuit 4 detects whether the motor is rotating upon the output of motor driving pulses ($P_1$) When the motor is stationary, rotation detecting circuit 4 provides a detecting signal as a feedback to motor driving waveform shaping circuit 3 which outputs a motor compensation pulse ($P_2$) Magnetic field detecting circuit 5 acts to increase the reliability of the motor when the motor moves the hands and cancels pulse $P_1$ and outputs pulse $P_2$ when an external magnetic field is applied to the timepiece. Waveform shaping circuit 3, rotation detecting circuit 4 and magnetic field detecting circuit 5 are known in the art as shown in Japanese Patent Laid-open Application Nos. 75550/79, 77162/79 and 87977/80 which are incorporated herein as if fully set forth.

Motor driving circuit 6 includes a pair of Pch metal oxide semiconductor (MOS) type field effect transistors (FET) 12, 13 and Nch MOS FETs 14, 15. Each FET is paired with a respective parasitic diode so that FET 12 is paired with a parasitic diode 16, FET 13 is paired with a parasitic diode 17, FET 14 is paired with a parasitic diode 18 and FET 15 is paired with a parasitic diode 19. Parasitic diodes 16–19 act as rectifying elements when an external A.C. voltage is applied to charge battery 8.

Figure 2A:
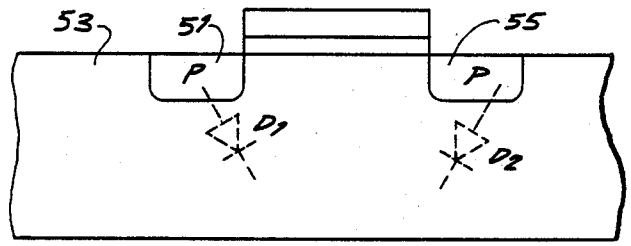
FIG. 2a is a sectional view of a Pch MOS type FET of a parasitic diode in accordance with the first embodiment of the invention.
Figure 2B:
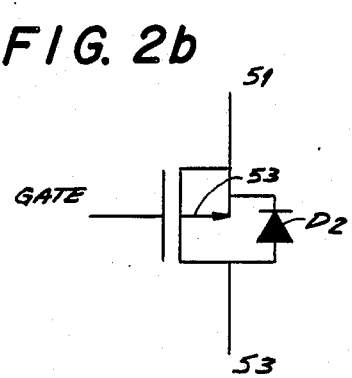

Reference is now made to FIG. 2a which shows a sectional view of a Pch MOS FET and FIG. 2b which is an equivalent circuit of FIG. 2a. In the Pch MOS FET a PN junction D1 is formed between source 51 and substrate 53 and a PN junction D2 is formed between drain 55 and substrate 53. Source 51 and substrate 53 have equal potential. Therefore when FET utilized for driving the motor PN junction D1 is invalid and the PN junction D2 serves only as a diode. Accordingly, drain 55 serves as an anode and source 51 serves as a cathode in this condition, PN junction D2 is a "parasitic diode".

The parasitic diodes 18, 19 of respective Nch MOS FETs 14, 15 are arranged in reverse to respective parasitic diodes 16, 17 of Pch MOS FET 12, 13 so that the substrate and source serve as anode and the drain serves as the cathode.

In the present invention, the parasitic diodes 16–19 are also utilized as rectifying elements so that no external rectifying element is required.

The motor includes a step motor coil 7. The motor is driven by controlling the ON/OFF state of FETs 12–15 during the moving of the hands. During charging of secondary battery 8, external charging source 11 interacts with motor coil 7. External charging device 11 generates an A.C. magnetic field which through electromagnetic induction causes motor coil 7 to charge secondary battery 8. During this time, parasitic diodes 16–19 act as a rectifying circuit. Timepiece 50 is driven by energy stored in secondary battery 8.

Figure 3:
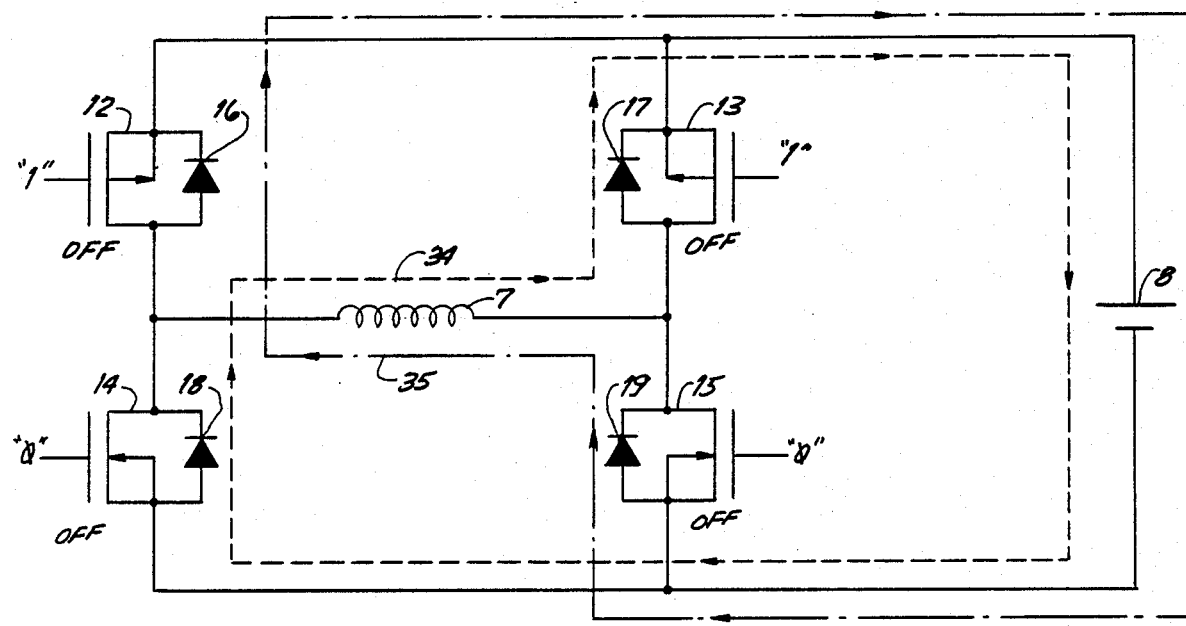
FIG. 3 is a schematic diagram of current flow for a full wave rectification during charging in the analog timepiece.

Reference is now made to FIG. 3 where in a schematic view of the direction of the current flow during charging of secondary battery 8 is provided. When the potential of the right side terminal of motor coil 7 is higher than the potential of the left side terminal of motor coil 7 current flows in the direction of arrow 34 upon the induction of A.C. voltage to motor coil 7. When the potential of the left terminal of motor coil 7 is higher than the potential of the right terminal of coil 7, current flows in the direction of arrow 35. Regardless of which of the potentials is higher, the current flows to secondary battery 8 in a charging direction so that the current is rectified by full waveform rectification.

Figure 4:
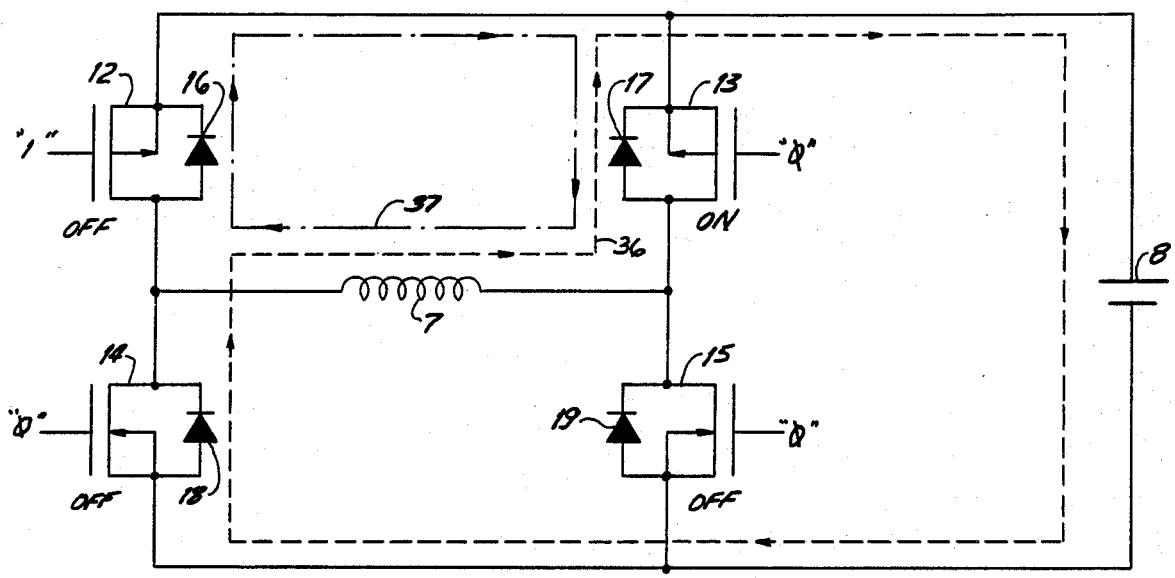
FIG. 4 is a schematic diagram showing current flow for a half wave rectification during charging of the analog timepiece.

To establish full waveform rectification FETs 12–15 must be turned to the OFF state. If even one of FETs 12–15 is in the ON state, a half waveform rectification occurs and current flow occurs as shown FIG. 4. By way of example, as shown in FIG. 4 if only FET 13 is turned to the ON state, the terminals of parasitic diode 17 are short circuited so that no diode bridge may be formed. Therefore, when the potential of the right side of motor coil is higher and the potential of the left side of motor coil 7, current flows in the direction of arrow 36 to charge secondary battery 8. However, when the potential of the left side of motor coil 7 is higher than the potential of the right side of motor coil 7, current flows in the direction of arrow 37 so that the current flows in the closed loop formed by parasitic diode 16 FET 13 and motor coil 7. Therefore, the current is rectified by half waveform rectification and secondary battery 8 does not become completely charged As a result, as will be discussed in greater detail below, the charging efficiency of timepiece 50 is decreased by half.

When both FETs 12 and 13 are in the ON state or both FETs 14 and 15 are in the ON state, secondary battery 8 is not charged at all. When FETs 12-14 are kept in the OFF state it becomes impossible to drive the step motor. However, it becomes necessary to charge secondary battery 8 without affecting driving of the step motor. Therefore, to provide a rectifying circuit having the greatest charging efficiency for secondary battery 8, it is necessary that each FET 12-15 be in the OFF state.

Reference is made to FIG. 5 wherein timing for driving the step motor and for charging the secondary battery is provided. The period for moving the hands of timepiece 50 is 1 Hz. Accordingly, all timing signals generated must be made synchronous with a 1 Hz signal generated by dividing circuit 2. A period of 117.2 msec beginning with the trailing edge of the 1 Hz signal becomes the period for driving the step motor. The remaining time period, 882.8 msec from the determination of the period of driving the step motor until the next trailing edge of the 1 Hz signal becomes the timing period for charging second battery 8. By dividing the period in such a way, the timing for driving the step motor and the timing for charging secondary battery 8 are alternatively repeated. Therefore, the period for charging battery 8, 882.8 msec of every one second, results in charging secondary battery 8 with only an approximately 10% decrease in charging efficiency. Accordingly, because the respective periods are controlled as above, it becomes possible to charge secondary battery 8 without affecting the movement of the hands, allowing the keeping of the correct time even when secondary battery 8 is being charged.

Figure 6:
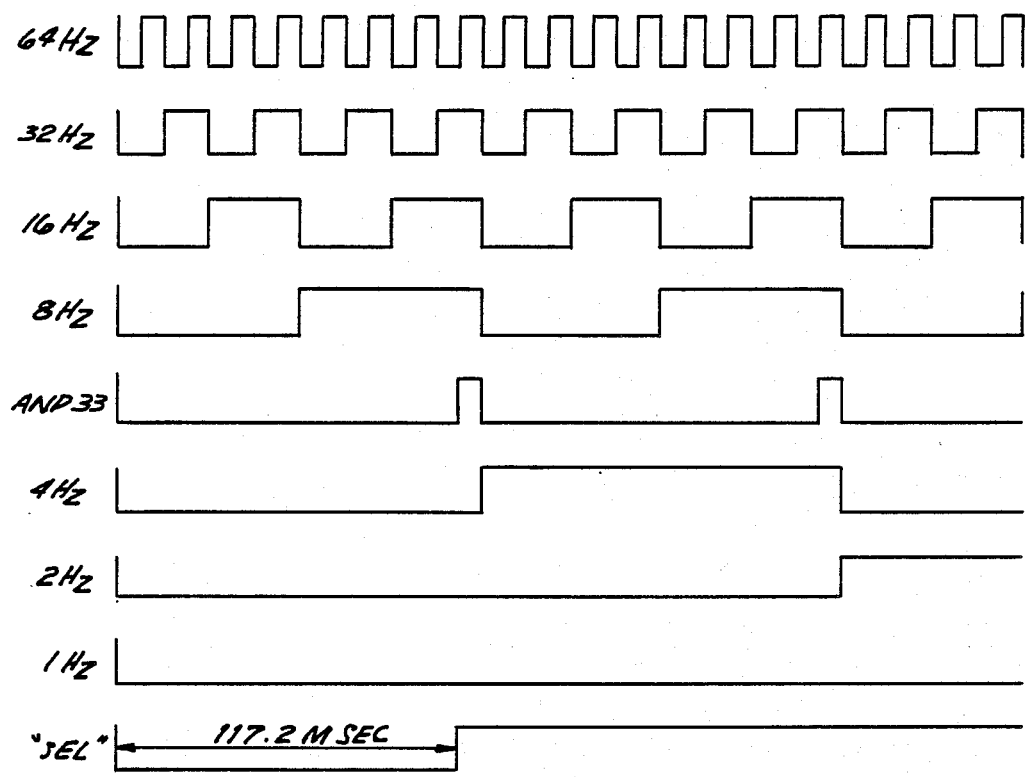
FIG. 6 is a timing chart for the signals of the logic circuit of the analog timepiece.

Reference is now also made to FIG. 6 wherein the operation of timepiece 50 is explained. Charging control circuit 9 (FIG. 1) includes an AND gate 33 and an OR gate 32 to receive respective inputs from dividing circuit 2. A plurality of AND gates 25-30 receive respective signals from waveform shaping circuit 3. The time period for driving the step motor and the time period for charging secondary battery 8 are controlled by charging control circuit 9. AND gate 33 receives respective signals 8 Hz, 16 Hz, 32 Hz and 64 Hz from dividing circuit 2 and produces a gated AND 33 signal which along with a 4 Hz signal, 2 Hz signal, 1 Hz signal output by dividing circuit 2 provide the inputs for an OR gate 32. OR gate 32 generates a SEL signal. The SEL signal becomes zero during the period extending for 117.2 msec from the trailing edge of the 1 Hz signal During this time, waveform shaping circuit 3 outputs signals $GP_{01}$, $GN_{01}$, $GP_{02}$ and $GN_{02}$. AND gates 25, 27, 28, 30 receive SEL signal as an input after it has passed through an op amp 31. AND gates 26, 29 directly receive the SEL signal as an input. AND gate 25 receives an input $GP_{01}$ thereby producing $GP_{01}$ as an output to OR gate 23 which causes the output of a signal $GP_1$ from AND gate 23. AND gate 23 also receives an input from OR gate 26 which has no output during this period. AND gate 27 receives a signal $GN_{01}$ as an input from waveform shaping circuit 3 and produces a gate signal $GN_1$ to the gate of FET 14. Similarly, AND gate 28 receives signal $GP_{03}$ as an input from waveform shaping circuit and produces an AND gated signal to an OR gate 24. OR gate 24 also receives an input from AND gate 29 and outputs AND gates signal $GP_2$ to the gate of FET 13. AND gate 30 also receives signal $GN_{02}$ as an input from waveform shaping circuit 3 and produces gated signal $GN_2$ which is input at the gate of FET 15.

The outputting of signal $GP_{01}$, $GN_{01}$, $GP_{02}$ and $GN_{02}$ are output by motor driving waveform shaping circuit 3 to eventually form a series of motor driving pulse $SP_0$, $SP_1$, $P_1$, $SP_2$ and $P_2$. $SP_0$ and $SP_1$ are magnetic detecting pulses. $P_1$ is the first motor pulse. $SP_2$ is the rotation detecting pulse and $P_2$ is a second supplemental motor pulse. The detailed function of the respective pulses are explained in Japanese Patent Laid-Open Application No. 260883/85 which is incorporated herein as if fully set forth. Accordingly, the step motor is driven during the period when the SEL signal has a zero value.

When the SEL signal has a value of one, charging occurs. During charging, voltage detecting circuit 10 outputs an LIM signal having a value of one. AND gate 26 receives the LIM signal as an input and produces an output signal to AND gate 23 causing AND gate 23 to output signal $GP_1$ so that $GP_1=LIM=1$. Similarly, AND gate 29 receives the LIM signal as an input causing AND gate 24 to produce an output $GP_2=LIM=1$. Additionally, when the SEL signal has a value of one, the signal $GN_1$ generated by AND gate 27 has a level of zero accordingly, $GN_1=0$. Similarly, $GN_2$ produced by AND gate 30 equals zero. Accordingly, FETs 12-14 are controlled so as to be in an OFF state regardless of the signals generated by motor driving waveform shaping circuit 3.

As discussed above, when FETs 12-15 are all simultaneously in the OFF state it becomes possible to charge secondary battery 8. A period Ti (FIG. 5) indicates the period from the beginning of the generating of signal $P_2$ to the leading edge of the period for charging secondary battery 8. This period is 25.4 msec and is the time required for stably driving the step motor. As disclosed in U.S. Pat. No. 3,969,642 (Japanese Patent Publication No. 40759/87) which is incorporated herein as if fully set forth, in the typical step motor driving system, after the output of the motor pulse, two motor driving FETs of the Pch side or two motor driving FETs of the Nch side are controlled so as to be in the ON state to cause a reverse incident current to the motor coil to break the rotor, thereby making it possible to stably drive the step motor.

Figure 7:
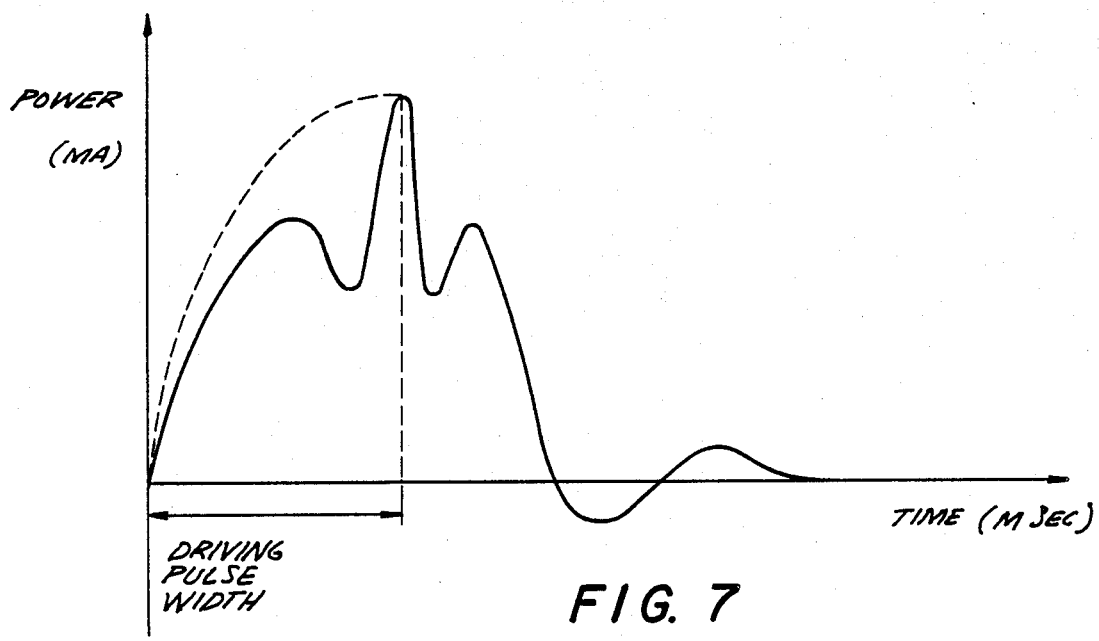
FIG. 7 is a graphic representation of the current input into the motor coil of the analog timepiece.

Reference is now also made to FIG. 7 wherein the current supplied to the motor coil is graphically presented. When the reverse incident current does not flow to the motor coil, a current waveform as shown in the dotted line is obtained. However, in actuality, the current waveform as shown in the solid line is what is obtained. When the rotor is stopped, reverse incident current does not flow. Therefore, as demonstrated in FIG. 7, a current value of zero indicates that rotation of the rotor has stopped. However, in the prior art since all FETs 12-15 are in the OFF state during charging, if charging is carried out immediately after the output of the motor driving pulse, it becomes difficult to break the rotor by supplying a reverse incident current making it impossible to stably drive the step motor. Even considering that the general angle for a two pole rotor is 180°, such a breaking of the step motor does not occur at the normal magnetic stable point, or result in the motor rotating twice, or other similar misoperations.

Figure 8:
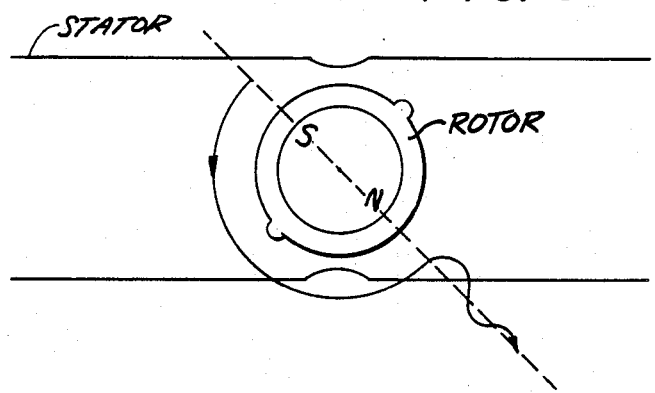
FIGS. 8a-8c are schematic views of the rotation of the rotor in accordance with the invention.
Figure 8B:
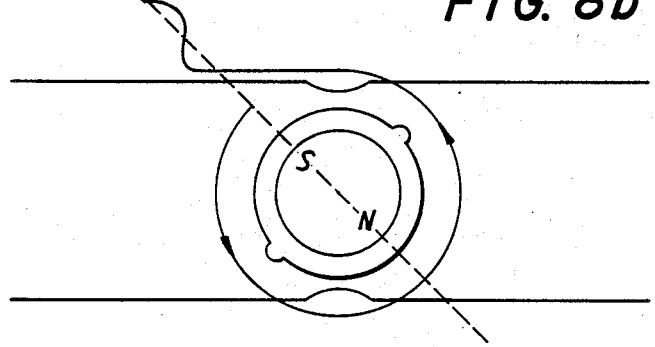
Figure 8C:
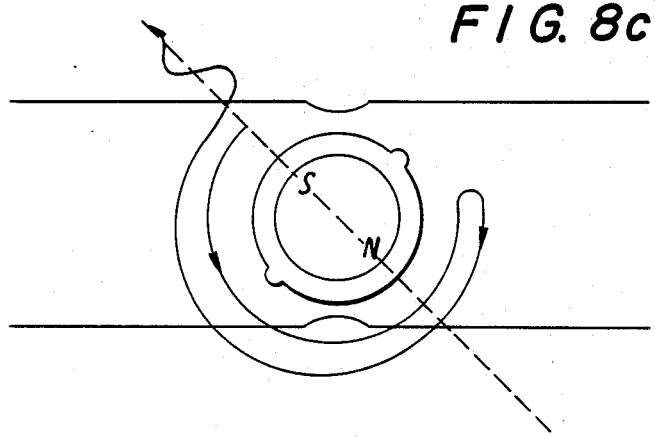

Reference is now made to FIGS. 8–8c wherein the normal rotation through 180° of the rotor, the twice rotation through 360° of the rotor and the reverse rotation of the rotor are provided. To eliminate these problems Pch FETs 12 and 13 are turned to the ON state upon the output of the motor pulse then all FETs 12–15 are turned to the OFF state to switch charging control circuit 9 to perform charging of secondary battery 8. Accordingly, it becomes possible to charge secondary battery 8 without affecting the driving of the step motor.

In this embodiment, the period Ti is predetermined to be 25.4 msec to arrive at an adequate time period. However, Ti is variable in accordance with the variation of the moment of inertia of the rotor. Generally, the smaller the diameter of the rotor, the shorter the period required from the generating of the motor driving pulse to the complete stop of rotor rotation. For example, when the minimum diameter of the rotor is 1 mm, the rotor is stopped in 10 msec. This is presently the minimum size and stopping time in an exemplary embodiment of the invention. Problems may be avoided by having a period Ti greater than 10 msec. When a common step motor is utilized, if the period Ti is approximately 20 msec, it becomes possible to stop the rotor completely and to switch to the charging time period. However, there is some difference in variation with rotor inertia and driving pulse width in wrist watches.

Additionally, to obtain a period Ti of 25.4 msec, the SEL signal must be maintained at the zero level for a period of 117.2 msec. In particular, a series of motor driving pulse are generated from the trailing edge of the 1 Hz signal and $P_2$ is generated for a period 91.8 msec beginning with the trailing edge of the 1 Hz signal. Because the SEL signal has a value of zero in synchronism with the 1 Hz signal, the period Ti is equivalent to the difference between the time at which the SEL signal has a 0 level and the period in which signal $P_2$ is generated; 25.4 msec. Therefore, the period when the SEL signal has a value of zero may be changed by changing the logic of AND gate 33 and OR gate 32 facilitating providing a suitable timing sequence adaptable to any step motor.

In this embodiment, the value of the period Ti is determined by using the time at which the $P_2$ is generated. During charging, a magnetic field is inevitably detected causing the output of magnetic detecting pulses $SP_0$ or $SP_1$ so that second supplemental motor pulse $P_2$ is always generated. Even in a timepiece in which no magnetic detecting means is provided and only the generated pulse of first motor pulse $P_1$ is utilized, the value of Ti may be determined by using the time at which $P_1$ is generated. There are several known motor driving methods wherein the motor is driven by a combination of several pulses. However, in any method or structure, the period Ti may be determined by determining the pulse for actually driving the motor, i.e., the pulse by which rotation of the motor is completely achieved.

In an exemplary embodiment, the frequency of the A.C. magnetic field is 1 Khz in order to stably drive the step motor. When the frequency is too low, the rotor becomes attracted by the A.C. magnetic field generating sympathetic vibrations within the rotor or causing misoperation of the hands. Where the rotor has a diameter of 1.2 mm it has been observed through experiments, that a rotor of this size is not affected by the A.C. magnetic field having a frequency of more than 600 Hz and as a result, the step motor is not adversely affected.

When secondary battery 8 becomes overcharged beyond the upper limit of the voltage storage capacity of secondary battery 8, deterioration or damage of the characteristics of secondary battery 8 may occur. To eliminate this problem, it becomes necessary to provide a circuit which prevents secondary battery 8 from being overcharged. Therefore, it becomes necessary to continuously monitor the voltage level of secondary battery 8 so as not to exceed the upper voltage limit. Reference is again made to FIG. 1 wherein voltage detecting circuit 10 is provided in electronic timepiece 50 to detect the voltage of secondary battery 8.

Voltage detecting circuit 10 includes a comparator 20 which receives an input from a reference voltage generator 22 and from a voltage decreasing resistor 21 which decreases the voltage ($V_{dd}$, $V_{ss}$) of secondary battery 8 to fall within a range in which comparator 20 can be operated. Voltage generator 22 outputs a lower voltage which is obtained by decreasing the predetermined voltage of a voltage limiting circuit. The ratio of the lower voltage produced by a reference voltage generator 22 to the predetermined voltage of the voltage limiting circuit is the same as the ratio of the lower voltage of resistor 21 to the voltage of secondary battery 8.

Voltage detecting circuit 10 provides an output to change control circuit 9 so that charge control circuit 9 also acts as a limiting circuit. Comparator 20 detects whether the voltage of secondary battery 8 exceeds the voltage predetermined by the limiting circuit. When the voltage of secondary battery 8 is higher than the voltage capacity, a LIM signal generated by comparator 20 is switched to a zero level. It follows, that it is necessary to set a predetermined value for the limiting circuit so that the upper voltage capacity limit of secondary battery 8 is not exceeded. When LIM signal, which is the signal for operating the limiting circuit, has a level of zero, if SEL signal has a value of 1, indicating a charging period ($GP_1=GP_2=LIM$, $GN_1=GN_2=0$) Pch FET 12 and 13 are in the ON state and Nch FETs 14 and 15 are in the OFF state.

Figure 9:
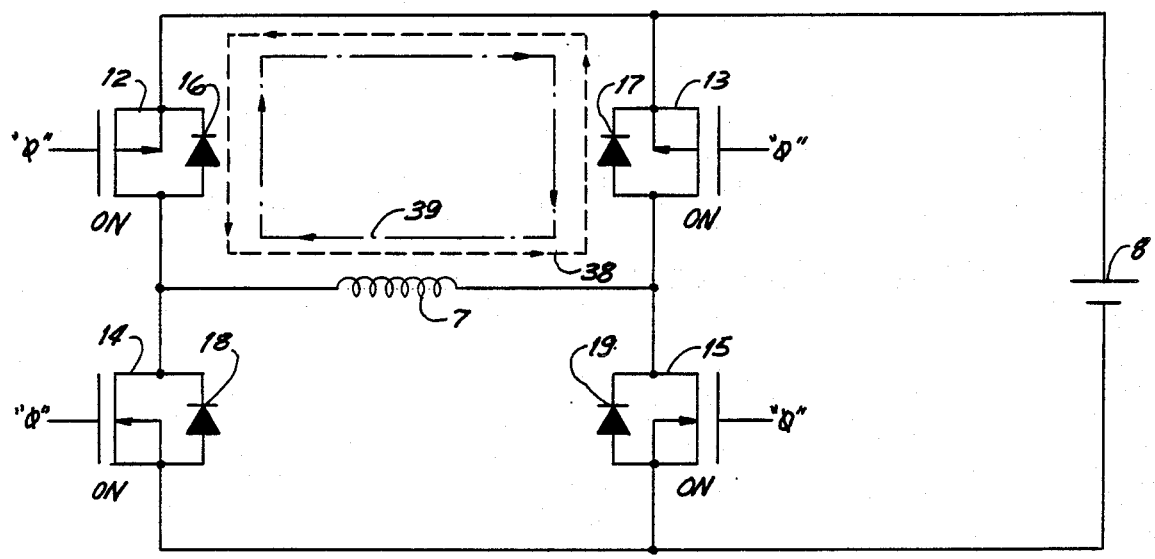
FIG. 9 is a schematic view of the current flow during operation of the limiting circuit in accordance with the invention.

Reference is now also made to FIG. 9 in which a schematic diagram illustrating the current flow during the operation of the limiting circuit is provided. When the potential of the right side of motor coil 7 is higher then the potential of the left side of motor coil 7, the current flows in the direction of arrows 38. On the other hand, when the potential of the left side of motor coil 7 is higher than the potential of the right side of motor coil 7, the current flows in the direction of arrow 39. Accordingly, current flow to secondary battery 8 is prevented protecting secondary battery 8 against excessive voltage.

In the above embodiment, Pch FETs 12 and 13 are in the ON state during operation of the limiting circuit. However, if Nch FETs 14 and 15 are in the ON state, the same effect would be obtained. The voltage of secondary battery 8 is always detected by voltage detecting circuit 10. However, if secondary battery 8 has a large internal resistance, the sample voltage may be detected at random during operation of the limiting circuit. In particular, corresponding to the internal resistance of secondary battery 8 during charging so that any misdetections may be decreased.

Figure 10A:
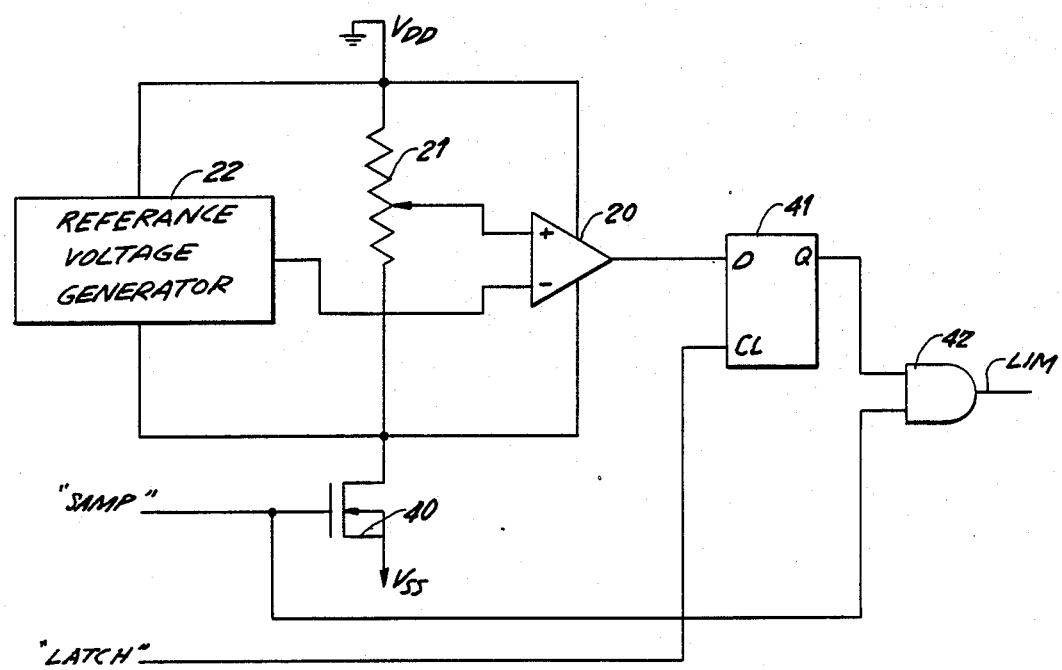
FIG. 10a is a block diagram of a detecting circuit constructed in accordance with the a second embodiment of the present invention.

Reference is now made to FIG. 10a in which another embodiment of voltage detecting circuit for random detection during operation of the limiting circuit is provided. The voltage detecting circuit of FIG. 10 is similar to voltage detecting circuit 10 however it also includes a transistor 40 for receiving a sampling signal, flip-flop 41 which acts a latch and AND gate 42 to gate the LIM signal.

Figure 10B:
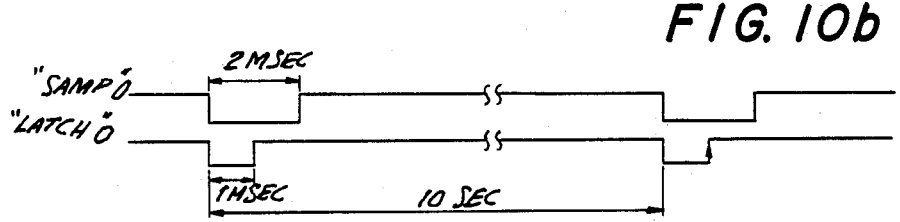

A Sample signal, "Samp" is input at the gate of transistor 40. As can be seen in FIG. 10b, the Samp signal has an active period 2 msec during each 10 second interval. During an active period, the value of Samp is zero, this is known as the sampling period. When transistor 40 is turned to the ON state power is supplied to comparator 20 voltage decreasing resistor 21 and voltage generating circuit 22 thereby making it possible to detect the voltage ($V_{dd}-V_{ss}$)) of secondary battery 8. During the sampling period, the LIM signal switches output by AND gate 42 to a zero level so that charged control circuit 9 acts as a limiting circuit preventing charging current from flowing to secondary battery 8 and preventing misdetection of voltage.

Flip-flop 41 latches the output of comparator 20 during the sampling period and maintains the latched condition until the next sampling period. A Latch signal generated in synchronism with the Samp signal is input to flip-flop 41 at the clock input to act as clock signal for flip-flop 41. The Latch signal has a zero value for 1 msec corresponding with the first millisecond of the sampling period. The signal generated by comparator 20 is input flip-flop 41 at the leading edge of Latch signal.

The voltage detecting circuit as constructed in FIG. 10a is effective in reducing power consumption as well as preventing the misoperation of secondary battery 8. Because power is only supplied to comparator 20, voltage decreasing resistor 21 and reference voltage generator 22 during a sampling period, the current consumed by the voltage detecting circuit is decreased. Therefore, when secondary battery 8 has comparatively lower internal resistance and the voltage detecting circuit has the above construction it is possible to decrease power consumption. The sampling period and sampling width are set in the above embodiment, but can be changed in accordance with variation of construction.

Figure 11:
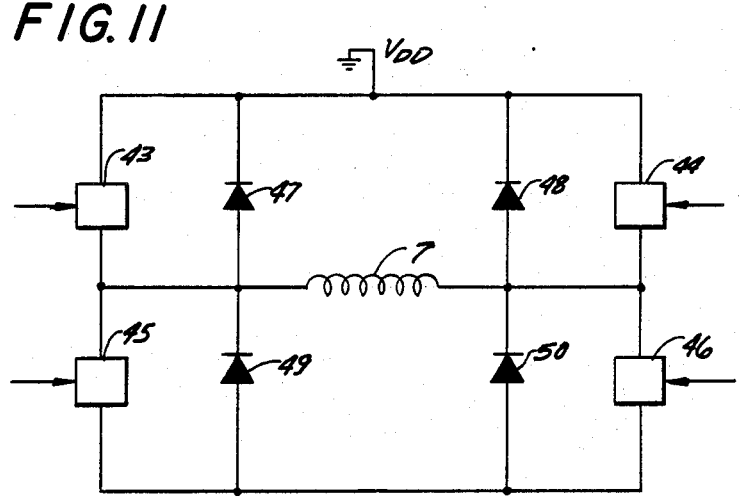
FIG. 11 is a block diagram of a charging circuit constructed in accordance with another embodiment of the invention.

Reference is now made FIG. 11 wherein another embodiment of the motor driving circuit is presented. In the above embodiments, parasitic diodes are provided for the motor driving FET to act as a rectifying element. However, when it is not possible to reconstruct the parasitic diode or the current can not efficiently flow through the parasitic diodes due to the construction, a motor driving circuit consisting of switching elements 43 through 46 is provided. Diodes 47, 48, 49, 50 are connected directly to coil 7 and form an electrostatic input bypass to act as a rectifying means. This provides the same effect as the parasitic diodes of the above embodiments, thereby it does not become necessary to provide additional rectification diodes which result in a larger area for the integrated circuit of the timepiece.

By providing a limiting circuit produced by forming a closed loop with the motor driver FETs it is possible to provide an improved chargeable analog electronic timepiece having a limiting element which does not require any external electronic circuit or charging mechanism. Accordingly this results in a dress watch in which the appearance need not be changed while providing a small sized low cost electronic timepiece.

Additionally, by providing an analog electronic timepiece having a motor driving circuit a step motor and chargeable secondary battery as a driving power source utilizing MOS type FET as the motor driving circuit and inducing an A.C. voltage through the coil of the step motor by an external A.C magnetic field and rectifying the current through a parasitic diode formed between the substrate and drain of the MOS type FET, an improved structure for charging a secondary battery is provided. The coil for charging the secondary battery also serves as the coil for driving a step motor, while the parasitic diode is also utilized as a rectifying circuit and the motor driving FET is also utilized as a limiting circuit. Therefore, it is possible to provide a chargeable analog electronic timepiece by adding a small logic circuit to a general integrated chip without any external electronic circuitry or charging mechanism. Additionally, it becomes possible to provide a small low cost chargeable timepiece which does not change the overall appearance of thin dress watches. Additionally, it is possible to charge the watch while the watch hands are moving resulting in the keeping of time during the charging process and eliminating the requirement to reset the time after charging the secondary battery.

By providing two switching elements connected to both terminals of the step motor coil and to the plus side of the secondary battery and two switching elements connected to both terminals of the step motor coil and to the negative side of the secondary battery, a PN junction formed parallel to respective switching elements and providing at least three respective switching elements in the OFF state except for a period of 10 msec at the leading edge of the driving pulses of the step motor it becomes possible to more efficiently charge the secondary battery. Even when the hands are being operated, the coil for charging the secondary battery may also serve as the coil for driving the motor while the parasitic diode also serves as a rectifying circuit, thus eliminating the need for superfluous or external charge elements. Therefore, in a chargeable analog electronic timepiece only a small logic circuit need be added to the IC of the analog timepiece to produce these results removing the need for an external electronic circuit or other external charging means. Additionally, the ornamental appearance of the electronic timepiece is no longer affected by the external circuitry and it becomes possible to provide a small size low cost chargeable analog electronic timepiece.

By providing a voltage detector for detecting the voltage of the secondary battery and charge control circuit for controlling the charging of the secondary battery the charge control circuit receiving an input from the voltage detector when the voltage of the secondary battery reaches a predetermined maximum value, both terminals of the coils of the step motor become short circuited preventing the secondary battery from overcharging. By utilizing MOS type FET for driving the motor and as a coil short circuit device, no extrinsic limiting elements are required. The area of the integrated chip remains substantially the same as integrated chip of the prior art timepieces. Thus it makes it possible to provide a small sized inexpensive charge timepiece.

It will thus be seen that the object set forth above, among those made apparent from the proceeding description are efficiently attained and since certain changes may be made in the above construction without departing from the spirit and the scope of the invention. It is intended that all matter contained in the above description or shown in the accompanying drawings shall be interpreted as illustrative and not in a limiting sense.

It is also to be understood that the following claims are intended to cover al the generic and specific features of the invention herein described and all statements of the scope of the invention which as a matter language might be said to fall therebetween.

What is claimed is:

1. A chargeable analog electronic timepiece chargeable by an external A.C. voltage source comprising:
   a step motor having a driving coil, the coil having a first terminal and a second terminal;
   a chargeable battery;
   motor driving means coupled to the first terminal of the coil and the second terminal of th coil for receiving A.C. voltage and selectively applying a charge to the coil for driving the motor and for selectively applying a charge to the coil for charging the chargeable battery;
   charge control means for controlling the period in which the motor driving means charges the chargeable battery and drives the motor; and
   rectifying means for rectifying the A.C. voltage prior to charging of the secondary battery, the rectifying means including at least one PN junction placed in parallel to the motor driving means.

2. The chargeable analog electronic timepiece of claim 1, further comprising voltage detecting means for detecting the voltage of the chargeable secondary battery and providing an output to the charge control means causing the motor driving means to switch from applying a charge to the coil for charging the chargeable battery when the voltage of the chargeable secondary battery has reached a predetermined level, thereby preventing overcharging of the chargeable secondary battery.

3. The chargeable analog electronic timepiece of claim 1, wherein the motor driving means includes MOS type FET having a substrate and drain for driving the motor and the PN junction includes a parasitic diode formed between the substrate and drain of the MOS type FET.

4. The chargeable analog electronic timepiece of claim 3, wherein the motor driving means includes four MOS FET being in either an ON state or an OFF state, and during charging of the chargeable secondary battery at least three of the MOS type FET are in the OFF state.

5. The chargeable analog electronic timepiece of claim 1, wherein the charge control means receive a plurality of timing signals and comprises gate means for producing a gated control signal in response to the timing signals for controlling the period in which the motor driving means charges the chargeable battery and drives the motor.

6. The chargeable analog electronic timepiece of claim 4, wherein the charge control means receives a plurality of timing signals and comprises gate means for producing a gated control signal in response to the timing signals, the gated control signal being received by the motor driving means and determining the state of each MOS type FET.

7. The chargeable analog electronic timepiece of claim 2, wherein the voltage detecting means includes reference voltage generating means, a voltage reducing resistor and comparison means, the comparison means comparing the voltage of the reference generating means and the voltage of the voltage decreasing resistor and providing a limiting signal in response thereto, the limiting signal being received by the charge control means for controlling the period in which the switching means charges the chargeable battery.

8. The chargeable analog electronic timepiece of claim 7, wherein the voltage detecting means receives a Samp signal and Latch signal and further comprises a transistor for receiving the Samp signal and gate means for receiving the Latch signal and the limiting signal and producing a gated LIM signal for controlling the period in which the motor driving means charges the chargeable battery.

9. The chargeable analog electronic timepiece of claim 2, wherein the voltage detecting means detects a voltage of the chargeable secondary battery corresponding to the predetermined voltage and the voltage detecting means provides an output to the charge control means causing both terminals of the coils to short circuit except during the period in which the motor is driven.

10. The analog electronic timepiece of claim 1, wherein the PN junction includes a plurality of diodes, each diode being coupled at either the first terminal or the second terminal, whereby the diode acts as an electrostatic input bypass.

11. A chargeable analog electronic timepiece chargeable by an external A.C. voltage source comprising:
    a step motor having a driving coil, the coil having a first terminal and a second terminal;
    a chargeable secondary battery having a positive terminal and a negative terminal;
    a first switching means and a second switching means, the first switching means being coupled intermediate the first terminal of the coil to the positive terminal of the secondary battery and a second switching means being coupled intermediate the second terminal of the coil and the positive terminal of the secondary battery, third switching means and fourth switching means, the third switching means being coupled intermediate the first terminal of the coil and the negative terminal of the battery, the fourth switching means being coupled intermediate the second terminal of the coil and to the negative terminal of the battery, each switching means being in either an OFF state or an ON state; and
    rectifying means for rectifying the A.C. voltage during charging of the secondary battery, the rectifying means including a respective PN junction disposed in parallel to each switching means, and the step motor producing driving pulses and the switching means short circuiting terminals of the coil after determination of each output of the driving pulse and thereafter at least three of the respective switching means being in the OFF state.

12. A chargeable analog electronic timepiece chargeable by an external A.C. voltage source comprising:
    a step motor having a driving coil, the coil having a first terminal and a second terminal;
    a chargeable secondary battery;
    a first switching means and a second switching means, the first switching means being coupled intermediate a first terminal of the coil and the positive terminal of the secondary battery and a second switching means being coupled intermediate the second terminal of the coil and the positive terminal of the secondary battery, third switching means and fourth switching means, the third switching means being coupled intermediate the first terminal of the coil and to the negative terminal of the battery, the fourth switching means being coupled intermediate the second terminal of the coil and the negative terminal of the battery, each switching means being in either an OFF state or an ON state; and rectifying means for rectifying the A.C. voltage during charging of the secondary battery, the rectifying means including a respective PN junction disposed in parallel to each switching means, each switching means including a MOS type FET having a substrate and a drain for driving the motor and the PN junction including a parasitic diode formed between the substrate and drain of the MOS type FET and the step motor producing driving pulses and the switching means short circuiting terminals of the coil after determination of each output of the driving pulse and thereafter at least three of the respective switching means being in the OFF state.

13. The chargeable analog electronic timepiece of claim 12 wherein the switching means includes four MOS type FET and during charging of the chargeable secondary battery at least three of the MOS type FET are in the OFF state.

* * * * *